Dec. 30, 1952          P. M. KOCH          2,623,402

GEAR SHIFTING ATTACHMENT

Filed July 1, 1950          2 SHEETS—SHEET 1

INVENTOR:
Philip M. Koch
BY Paul & Paul
ATTORNEYS.

Dec. 30, 1952 P. M. KOCH 2,623,402
GEAR SHIFTING ATTACHMENT
Filed July 1, 1950 2 SHEETS—SHEET 2

INVENTOR:
Philip M. Koch
BY Paul & Paul
ATTORNEYS.

Patented Dec. 30, 1952

2,623,402

UNITED STATES PATENT OFFICE 2,623,402

GEAR SHIFTING ATTACHMENT

Philip M. Koch, Philadelphia, Pa.

Application July 1, 1950, Serial No. 171,639

3 Claims. (Cl. 74—334)

1

This invention relates to a gear shifting attachment adapted for convenient installation in a vehicle such as an automobile or the like. More particularly, the invention concerns a solenoid-operated gear shifting device capable of being associated with conventional manual gear shifting equipment on existing vehicles for automatic preselection and shifting of gears in response to the movement of the clutch operating mechanism.

Magnetic gear shifting devices such as solenoids and the like have been used to a limited extent in the automotive industry. Such magnetic devices have frequently been associated with push buttons or other gear-selecting switches operable from the dash board of the vehicle and have been constructed to shift gears in response to the movement of the clutch pedal. However, such devices have not effectively eliminated the need for hand manipulation of gear-selecting or shifting mechanisms and have accordingly not enjoyed any lasting success from a commercial viewpoint. Other magnetic devices which operate in response to speed gauging devices in the vehicle have been said to represent a completely automatic gear shifting mechanism, but these embody expensive and involved electric circuits and equipment and have been found to require excessive maintenance.

It is accordingly an object of this invention to provide a simple economical magnetic gear shifting attachment for vehicles. Another object of my invention is to provide magnetically energized gear shifting means having capacity to preselect the gears to be shifted according to a predetermined sequence without requiring manual operation. Still another object of the invention is to provide a magnetic gear shifting device for engaging different sets of gears in alternating sequence, and to provide a clutch-actuated switch for effecting such alternate engagement. Other objects and advantages of the invention, including the simplicity and economy of the same, and the ready adaptability of the same for attachment to vehicles of different character, will appear in further detail hereinafter and in the drawings.

In summary, the invention concerns an attachment including a plurality of solenoids constructed and arranged for mechanical connection to the transmission of a vehicle, each solenoid being effective when energized to change gears, electric circuits each including a solenoid, and a switch operatively connected to the circuits for energizing the solenoids in alternating sequence when the engine and transmission are disengaged.

Of the drawings:

2

In describing the single form of the invention exemplified by the accompanying drawings, specific terms will be employed for the sake of clarity, but it is to be expressly understood that the scope of the invention is not thereby limited, each such term being intended to embrace all equivalents which perform the same function for an analogous purpose.

Figure 1:
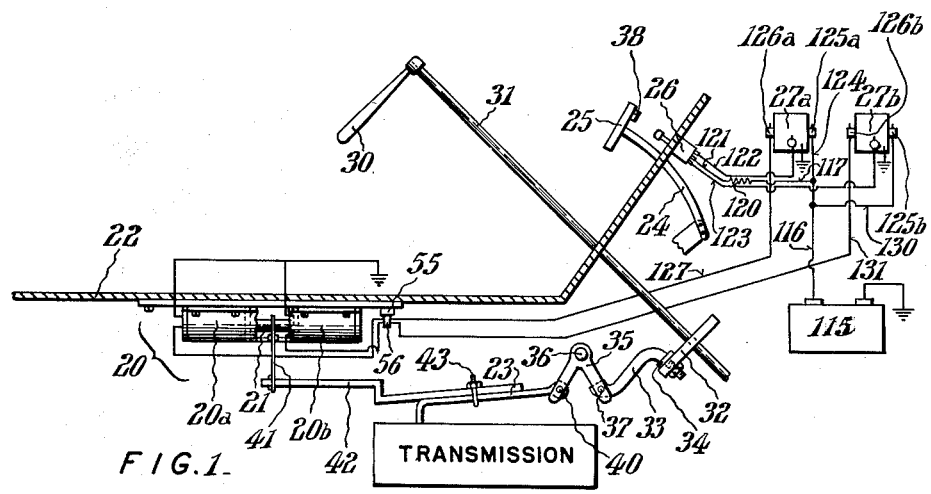
Fig. 1 represents a side elevation of portions of an automobile showing how the attachment may be electrically and mechanically connected for automatic gear shifting operation.

Referring now specifically to Fig. 1, the single embodiment of the invention there represented includes the shift impulse solenoid mechanism 20, consisting of solenoids 20a, 20b and solenoid shaft 21, which mechanism is adapted to be mounted beneath the floor 22 of a vehicle and for attachment to the conventional transmission lever 23 for changing gears. Also mounted beneath floor 22, adjacent the clutch lever 24 and below clutch pedal 25, is the switch 26 which is electrically connected, as indicated, to relays or switch solenoids 27a, 27b for operation of the shift impulse solenoids 20a, 20b. It will be observed that the apparatus of the invention is thus connected to the mechanical and electrical parts of a manually operable vehicle without removing or displacing any of the original manual gear shifting parts, which include the gear shift handle 30, gear shift column 31, sector 32 which is non-rotatably attached to gear shift column 31, lever arm 33 which is pivotally attached to collar 34, the latter being bolted to sector 32, the crank lever 35 which is pivotally attached at 36 to the frame of the vehicle and at 37 to lever arm 33, and the transmission lever 23 which is pivotally attached at 40 to crank lever 35.

Also unaltered by the attachment are the conventional clutch lever 24 and clutch pedal 25 which serve to actuate the switch 26 when the clutch pedal is depressed and the engine and transmission are out of engagement, as will be apparent. However, the clutch pedal 25 desirably carries a wear block 38 which contacts switch 26 when the clutch pedal 25 is depressed. The details of the clutch mechanism and the transmission are conventional and are not shown.

The solenoid shaft 21 carries a rigid arm 41 which in turn is attached to link arm 42. Link arm 42 is constructed for attachment by means of U-bolt 43 to transmission lever 23, thereby affording means whereby the shift impulse solenoid 20 actuates the movement of the transmission parts to shift gears.

It will be appreciated that the electrical connections appearing in Fig. 1 are merely schematic and are included in Fig. 1 merely in order to indicate the general character of appropriate electric connections, which are discussed in detail hereinafter.

Figure 2:
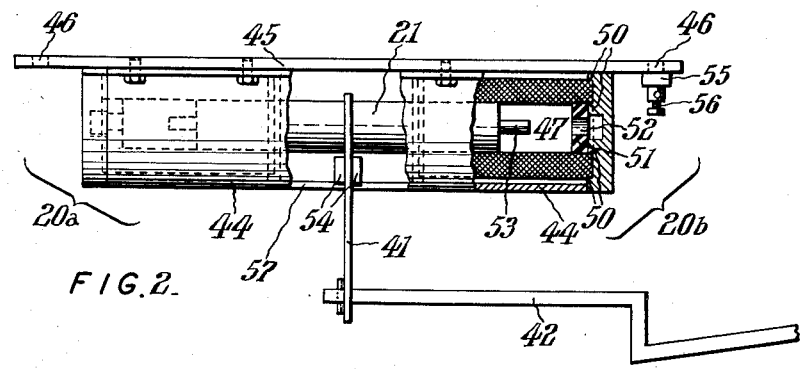
Fig. 2 represents a side elevation of the shift impulse solenoid constituting one element of the automatic shifting mechanism, with a part broken away and shown in section in order more clearly to disclose important details.
Figure 3:
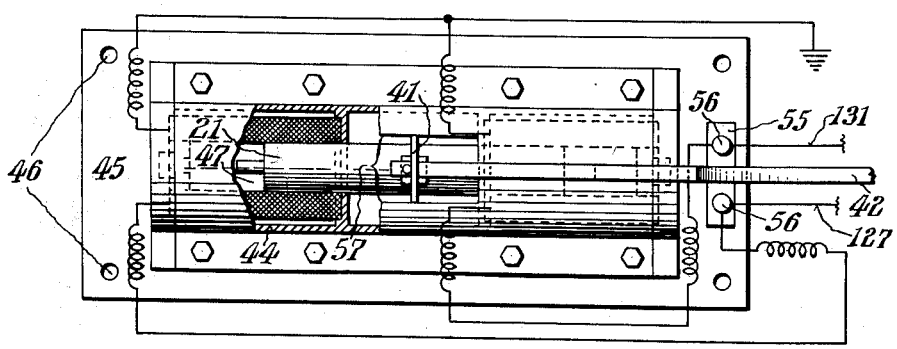
Fig. 3 represents a view looking upwardly upon the bottom of the shift impulse solenoid of Fig. 2, with a part broken away as indicated, also including a diagrammatic representation of electric connections for the shift impulse solenoid.
Figure 5:
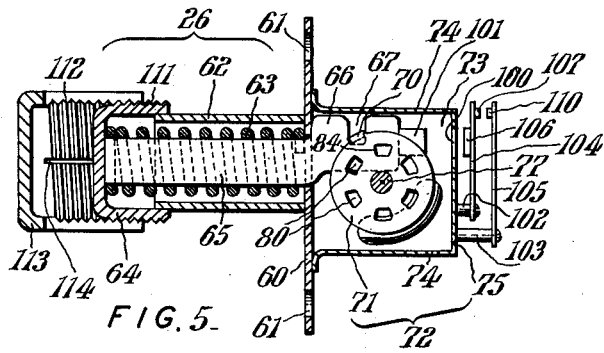
Figs. 5, 6, 7 and 8 represent sectional and fragmentary sectional views taken as indicated respectively by the lines and arrows V, VI, VII and VIII, which appear in Fig. 4.
Figure 6:
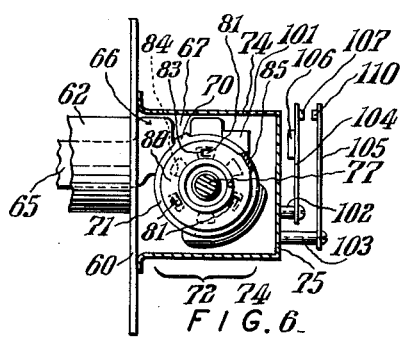

Referring more particularly to Figs. 2 and 3 of the drawings, shift impulse solenoid mechanism 20 includes the solenoids 20a, 20b which are enclosed in casing 44 attached to the baseplate 45 by means of screws. In turn, baseplate 45 is provided with apertures 46 for convenience of attachment to the floor of the vehicle.

Each solenoid 20a, 20b consists of a cylinder having a hollow core 47 serving as a guide track for the longitudinal path of reciprocation of solenoid shaft 21. The solenoids 20 fit in accommodating recesses in the ends of casing 44 and are held in position by shoulders 50. Also disposed in the hollow core 47, at each outer end thereof, is a rubber shim or shock-absorber 51 having a central aperture 52 having a diameter of sufficient size to accommodate pilot induction pins 53 of solenoid shafts 21 when the shaft 21 assumes an extreme position adjacent either end of casing 44. Arm 41 also carries shock absorbing pads 54, of rubber or the like, which are adapted to protect arm 41 and the associated mechanism from shock during operation of the solenoid shifting mechanism.

Mounted on base plate 45 is an insulated electric terminal block 55 carrying connecting terminals 56 for the electrical conduits which serve to energize the solenoids 20a, 20b in a manner more fully to be explained hereinafter. Such conduits, together with the electrical conduits directly associated with the solenoids 20a, 20b are represented in Fig. 3.

The casing 44 completely encloses the shift impulse solenoid mechanism from all sides but is provided with a longitudinally extending slotway 57 which accommodates and serves as a guide for the rigid arm 41.

The switch 26 which is of novel construction and constitutes an important element of the magnetic shifting apparatus, is represented in particular detail in Figs. 4-8. The switch 26 has a flat plate 60 provided with apertures 61 which accommodate bolts or like means for attaching the switch 26 to the floor of the vehicle. Attached to the flat plate 60 is a tube 62 enclosing the spiral spring 63. Slidably fitted over the outer surface of tube 62 is a cap 64 carrying the switch operating arm 65 which is affixed to cap 64. The spring 63 bears against flat plate 60 and cap 64 thereby urging cap 64 toward the left as viewed in Fig. 5. The extent of such movement is limited by the projection 66 of switch operating arm 65 which contacts the flat plate 60.

Figure 4:
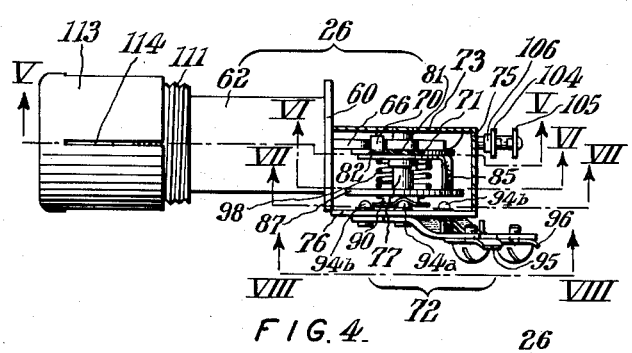
Fig. 4 represents a side elevation, partly in section, of the switch which constitutes another element of the automatic shifting mechanism.
Figure 7:
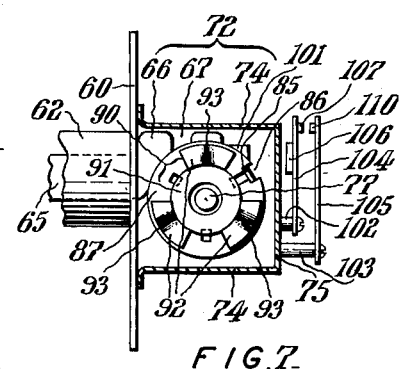

Switch operating arm 65 has a notch 67 which receives the upstanding lug 70 formed integrally with driving disc 71. Driving disc 71 is contained in an enclosure 72 having front wall 73, side walls 74, an end wall 75 and an insulating back wall 76, such enclosure 72 being attached to the flat plate 60 at the side opposite the tube 62. Front wall 73 of enclosure 72 carries a pivot pin 77 about which driving disc 71 is free to rotate. Driving disc 71 has openings 80 which are spaced to receive the inclined studs 81 which constitute an integral part of driven disc 82, the latter being rotatably mounted on pin 77 in face to face relation with driving disc 71. Referring particularly to Fig. 4, it will be apparent that the studs 81 which are inclined relative to the plane of disc 82 extend into the spaced openings 80 of disc 71 which is partly in section in this figure and have flat lagging edges 83 which contact the lagging edges 84, constituting one boundary of openings 80 in disc 82, when the switch operating arm 65 is moved toward the right from the position it occupies as observed in Fig. 6. The flat surfaces of these edges 83, 84 contact each other thereby transmitting rotary motion from drive disc 71 to driven disc 82. However due to the inclination of the studs 81, no motion is imparted to the driven disc 82 when the arm 65 is moved toward the left to the position it occupies as observed in Fig. 6, and driving disc 71 rotates relative to driven disc 82. Driven disc 82 carries the projecting lug 85 which engages the slot 86 in contact disc 87 which is also rotatably mounted on pivot pin 77.

Figure 8:
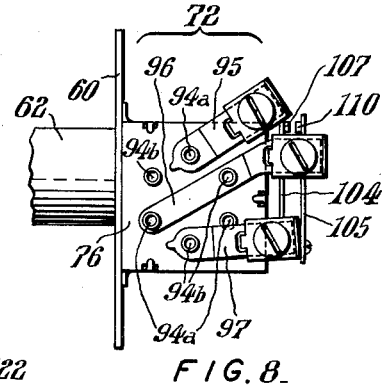

Non-rotatably attached to contact disc 87 is the metallic contact piece 90 having a central portion 91 carrying three integrally formed contact clips 92. The contact clips 92 have central depressions 93 suitably shaped to accommodate the electric contacts 94a, 94b, as appears in particular detail in Figs. 4 and 7. The contacts 94a, 94b are stationarily mounted on insulating back wall 76 and are connected electrically to the three terminals 95, 96, 97 as indicated in Fig. 8 of the drawings. Spring 98 urges contact clips 92 toward contacts 94a, 94b.

It will be observed that of the contacts 94a, one is connected to terminal 95, another to terminal 96, and the other is free of connection to any terminal. Similarly of contacts 94b, one contact is connected to terminal 96, another to terminal 97, and the third unconnected. It will be apparent that two different settings of the contact clips 92 relative to the contact elements 94a, 94b may be effected. In accordance with one such setting the terminals 95, 96 are electrically connected, and in accordance with the other setting the terminals 96, 97 are electrically connected in similar manner. Accordingly the movement of switch operating arm 65 to the right as viewed in Fig. 6 breaks the connection between one set of contacts and also establishes connection between the other set of contacts. Return movement of switch operating arm 65, in the opposite direction, does not change the electric connections thus established.

The end wall 75 of switch 26 is apertured at 100 providing free space for penetration of the extension arm 101 which is formed integrally with switch operating arm 65. Also mounted on the end wall 75 are the electrically insulated terminals 102, 103 which respectively carry the spring metal leaves 104, 105. The spring metal leaf 104 carries a block 106 of electric insulating material. The block 106 is in alignment with the switch operating arm 65 and disposed in the path of advancement of extension arm 101 which serves when moved toward the leaf 104 to bend the spring metal leaf 104, thereby bringing together the electric contacts 107, 110. Due to their inherent resiliency the spring leaves 104, 105 assume separate positions in which the contacts 107, 110 are open when the extension arm 101 is withdrawn from block 106.

Block 106 and extension arm 101 are spaced apart at a distance greater than the minimum distance traveled by switch operating arm 65 necessary for resetting the contact clips 92. Accordingly the contact clips 92 serve as preselecting means effective to switch from one electric circuit to select another in response to movement of switch operating arm 65, and spring metal leaves 104, 105 may serve to close the selected circuit or another circuit in response to further movement of switch operating arm 65 in the same direction.

It will be observed that cap 64 has threads 111 engaging threads 112 of adjusting head 113. The adjusting head 113 has an inside diameter slightly less than the outside diameter of cap 64 and is provided with longitudinal slots 114 dividing adjusting head 113 into four resilient portions and thereby attaining tight fitting contact between the threads 111, 112. Since the clutch pedal 24 or other moving part of the clutch operating mechanism also operates switch 26 by contacting the free end of adjusting head 113, the gear shifting action may be timed and coordinated with the clutch disengaging action by adjusting the distance between the adjusting head 113 and the clutch operating mechanism. Such adjustment is conveniently attained by turning the adjusting head 113 relative to cap 64.

Figure 9:
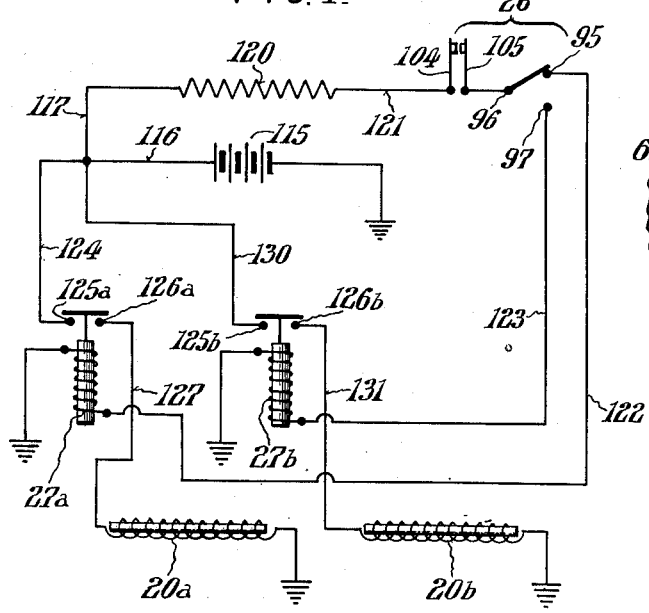
Fig. 9 represents a wiring diagram illustrating the electric connections for the gear-shifting apparatus.

Referring now to Fig. 9 of the drawings, wherein one form of wiring diagram for the gear shifting device is represented, 115 designates the battery one terminal of which is connected to ground, the other terminal being connected to conductor 116 which supplies current for operating the shift impulse solenoids 20a, 20b. The battery is connected through conductors 116, 117, resistor 120, and conductor 121 to spring metal leaf 104 of switch 26. Spring metal leaf 105 is connected to terminal 96 of the selector portion of switch 26, the other terminals thereof being designated 95 and 97. Terminal 95 is connected through conductor 122 to the magnetic coil of relay or switch solenoid 27a and thence to ground. Similarly terminal 97 is connected through conductor 123 to relay or switch solenoid 27b, and to ground. The circuits including the switch solenoids 27a, 27b are low current auxiliary circuits, which may include the resistor 120 as shown or may include equivalent electric elements serving to decrease the current flow. In practice, the energy for these auxiliary low-current circuits may be obtained by connection to low-current meter terminals on the instrument panel of the vehicle.

Battery 115 is connected through conductors 116, 124 to the switch contact 125a of switch solenoid 27a. Contact 126a is connected by conductor 127 through shift impulse solenoid 20a and thence to ground. When switch solenoid contacts 125a, 126a are closed, a relatively high current flows through the circuit thus completed. Similar connections, including conductor 130, contacts 125b and 126b, conductor 131, solenoid 20b, and ground connection are provided for energizing shift impulse solenoid 20b.

From the foregoing description the operation of the magnetic gear shift attachment will be readily apparent. Assuming for purposes of illustration that the attachment is operatively connected as illustrated in Figs. 1 and 9, that switch 26 is initially set for energizing switch solenoid 27a, and that the transmission is initially set in neutral position, the operator may depress the clutch pedal 25 to a point where adjusting head 113 of switch 26 is contacted by the clutch pedal and resistance due to the action of spring 63 is encountered. In this position the clutch plates are disengaged and the gears may be shifted freely by hand in the conventional manner. However, further depression of the clutch pedal by the operator moves the switch operating arm 65, thereby rotating the contact clips 92 and shifting switch contacts as previously described to preselect the low current circuit including switch solenoid 27b. Still further depression of the clutch pedal brings the contacts 107, 110 together thereby closing the preselected switch solenoid 27b and energizing the corresponding shift impulse solenoid 20b. Immediately the shift impulse solenoid 20b moves the link arm 42 to shift gears into the corresponding position. When the operator subsequently permits the clutch pedal to rise, the switch elements 107, 110 separate and deenergize the switch solenoid 27b as well as the corresponding shift impulse solenoid 20b. As the clutch pedal is raised, switch operating arm 65 returns to its original position without changing the setting of the switch contacts as determined by the position of contact clips 92, and the clutch mechanism reestablishes engagement between the engine and transmission to drive the vehicle in the newly selected gear setting.

Thus it will be apparent that complete gear shifting control is available to the operator in that full manual control is attained by limiting the extent of depression of the clutch pedal, gears may be preselected for solenoid operation by depressing the clutch pedal slightly farther, and the actual shift in accordance with such preselection is automatically accomplished by depressing the clutch pedal still farther. Frequently it will be desired merely to alternate between two gear ratios in operating an automobile, and this is accomplished by depressing the clutch pedal to the fullest extent, the gears being selected in alternating sequence by reason of the preselecting action of the switch 26.

While there is represented in the drawings a solenoid mechanism including the two solenoids 20a, 20b which move the transmission lever 23 along a straight line for alternate engagement of two different sets of gears, it will be appreciated that any number of such solenoids, suitably arranged with respect to the transmission mechanism, may be incorporated in the attachment for automatic operation to engage and disengage any or all the gear sets of the transmission. Moreover it will be understood that such operation may be fully automatic, the gears being preselected by selective depression of the clutch pedal, or may be semi-automatic with manual operation interposed when desired.

Although I have described my invention by reference to one embodiment thereof, it will be apparent to those skilled in the art that changes may be made in the particular form of the solenoids, the circuit selecting and energizing switches, and the circuits associated therewith, including reversals of parts and substitution of equivalent mechanisms, and that certain features of the invention may be used to advantage without the use of other features, all within the spirit of the invention as defined in the appended claims.

Having thus described my invention, I claim:

1. In a motor vehicle, the combination comprising a lever-actuated clutch and transmission, mechanical means manually operable for changing gears in said transmission, automatic transmission operating mechanism in the form of an attachment comprising spaced shift impulse solenoids, a solenoid shaft reciprocable between said shift impulse solenoids, mechanical means for connecting the solenoid shaft to the transmission to change gears, separate solenoid-energizing electric circuits each including one of said solenoids, a circuit-selector switch connected to said solenoid-energizing circuits, said circuit-selector switch having capacity to select different circuits in accordance with a definite repetitive cycle, changing from one circuit to another each time it is actuated, a switch operator arm having switch actuator means operatively connected to said circuit-selector switch, fixed means on said clutch lever for moving said switch operator arm, said fixed means and switch operator arm being spaced at a definite predetermined distance from one another greater than the distance through which the clutch lever must be depressed to disengage the clutch, the clutch being thereby disengageable independently of said circuit-selector switch.

2. In a vehicle having a floor, an engine, a transmission, and a clutch mechanism for engaging and disengaging the engine and transmission to permit changing gears, a clutch operating lever reciprocable through said floor and attached to the clutch mechanism, and a clutch pedal for reciprocating said clutch lever, an attachment comprising spaced electromagnets, a shaft reciprocable between said spaced electromagnets, mechanical linkage connecting said shaft to operate said transmission, electric circuits each connected to one of said electromagnets, and a switch common to said electric circuits, said switch being fixed relative to the floor of the vehicle and including a circuit preselector movable through a definite set of positions in a definite order, a switch operating member reciprocable adjacent to and substantially parallel to the reciprocation of the clutch lever and effective upon said circuit preselector to move it from one of said positions to the next position in said definite order, said switch operating member having an adjusting head mounted on the free end thereof for engagement with the clutch pedal when the clutch pedal is depressed, said head being mounted on said switch operating member with capacity for adjustment toward and away from said floor and accordingly so positioned with respect to the clutch lever that said switch is unaffected by depression of the clutch pedal to an extent sufficient to disengage the clutch, but is contacted by further depression of the clutch pedal to reset said circuit preselector, and a circuit closing element actuated through said cap and switch operating member to close the preselected circuit in response to still further depression of the clutch lever.

3. In a motor vehicle having a lever-actuated clutch and a transmission, a pair of shift impulse solenoids, a shaft longitudinally reciprocable under the influence of said shift impulse solenoids, mechanical means for connecting said shaft to operate said transmission, separate solenoid-energizing circuits each including one of said solenoids, a normally open switch included in each of said circuits to maintain the solenoids normally deenergized, a circuit selector switch connected to said solenoid-energizing circuits, said circuit selector switch being arranged adjacent the clutch lever with capacity to switch from one of said solenoid-energizing circuits to the other, and thus to preselect circuits in accordance with a definite, repetitive cycle, said normally open switch being positioned adjacent the clutch lever, a switch operator arm having a plurality of switch actuator means one operatively connected to said circuit selector switch and the other to said normally open switch, fixed means on said clutch lever for depressing said switch operator arm, said fixed means and switch operator arm being spaced at a definite predetermined distance from one another greater than the distance through which the clutch lever must be depressed to disengage the clutch, the clutch being thereby disengageable independently of said switches, the respective switch actuator means being spaced from one another so that upon further depressing the clutch lever the circuit preselector switch is actuated independently of the normally open switch and upon still further depressing the clutch lever the normally open switch is closed and a shift impulse solenoid thereby energized.

PHILIP M. KOCH.

REFERENCES CITED

The following references are of record in the file of this patent:

UNITED STATES PATENTS

| Number | Name | Date |
|---|---|---|
| 1,372,227 | Huggins | Mar. 22, 1921 |
| 2,182,438 | Kahn | Dec. 5, 1939 |
| 2,236,746 | Bush | Apr. 1, 1941 |
| 2,298,782 | Bluemle | Oct. 13, 1942 |